(12) United States Patent
Schütt

(10) Patent No.: US 6,431,636 B1
(45) Date of Patent: Aug. 13, 2002

(54) CONVERTIBLE VEHICLE ROOF AND CONVERTIBLE VEHICLE

(75) Inventor: Thomas Schütt, Fürstenfeldbruck (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/899,568

(22) Filed: Jul. 6, 2001

(30) Foreign Application Priority Data

Jul. 6, 2000 (DE) .......................................... 100 32 378

(51) Int. Cl.$^7$ ................................................... B60J 7/00
(52) U.S. Cl. .............. 296/107.18; 296/108; 296/107.17
(58) Field of Search ........................... 296/107.18, 108, 296/107.17, 107.08, 107.07, 107.16, 107.19, 107.2, 116

(56) References Cited

U.S. PATENT DOCUMENTS

| | | | | |
|---|---|---|---|---|
| 4,573,732 A | * | 3/1986 | Muscat ........................ | 296/108 |
| 5,078,447 A | * | 1/1992 | Klein et al. ............... | 296/107.2 |
| 5,558,388 A | | 9/1996 | Fürst et al. | |
| 5,593,202 A | * | 1/1997 | Corder et al. ............... | 296/108 |
| 5,810,422 A | * | 9/1998 | Corder et al. ............... | 296/108 |
| 5,829,821 A | * | 11/1998 | Aydt et al. ............. | 296/107.08 |
| 5,979,970 A | * | 11/1999 | Rothe et al. ........... | 296/107.18 |
| 6,053,560 A | * | 4/2000 | Rothe et al. ........... | 296/107.18 |
| 6,217,104 B1 | * | 4/2001 | Neubrand ............... | 296/107.18 |
| 6,312,042 B1 | * | 11/2001 | Halbweiss et al. ..... | 296/107.18 |
| 6,322,131 B1 | * | 11/2001 | Maass et al. .......... | 296/107.07 |
| 2001/0006297 A1 | * | 7/2001 | Dinter et al. .......... | 296/107.17 |
| 2001/0045759 A1 | * | 11/2001 | Russke .................. | 296/107.17 |
| 2002/0003355 A1 | * | 1/2002 | MacFarland ................ | 296/108 |

FOREIGN PATENT DOCUMENTS

| | | | |
|---|---|---|---|
| DE | 3342915 A1 | * | 6/1985 |
| DE | 44 35 222 C1 | | 11/1995 |
| DE | 299 01 589 U1 | * | 2/2000 |
| EP | 0 482 681 A1 | * | 9/1990 |
| FR | 2 965 080 A1 | * | 8/1992 |
| JP | 3-5237 | * | 1/1991 |

* cited by examiner

Primary Examiner—Kiran B. Patel
(74) Attorney, Agent, or Firm—Nixon Peabody LLP; David S. Safran

(57) ABSTRACT

A convertible vehicle roof (1) has a front roof part (3) and a rear roof part (4) which are mounted movably on the body of the vehicle and which can be put away into a roof storage space (20). The front roof part (3) is supported by a pivot-bearing device (9, 13) which is mounted displaceably on a guide device (16) fixed on the vehicle and which, during the opening and putting away of the front roof part (3), moves along the guide device (16) and in the process lowers the front roof part (3) into the roof storage space (20). The front roof part (3), when lowered into the roof storage space (20), can be arranged in an obliquely set or substantially vertical swung orientation.

30 Claims, 12 Drawing Sheets

CONVERTIBLE VEHICLE ROOF AND CONVERTIBLE VEHICLE

BACKGROUND OF THE INVENTION

1. Field of the Invention

The present invention relates to a convertible vehicle roof and to a convertible vehicle.

2. Description of Related Art

Gennan Patent DE 44 35 222 C1 discloses a vehicle roof having a front roof part and a rear roof part or rear element. The front roof part, which can be locked to the cowl via roof links which are articulated in a manner such that they can pivot, is articulated in a manner such that it can swing on the vehicle body by means of a pivot lever. The rear roof part adjoins the front roof part to the rear and sits in a sealing manner on a folding-top compartment flap which forms a transition to the trunk. The rear roof part is mounted in a manner such that it can be moved via a pivot lever which is mounted on the vehicle body, can be swung by means of a hydraulic cylinder and is coupled via a further hydraulic cylinder to the rear roof part at a rear articulation point of the roof part. The rear roof part is also mounted such that it can be moved by an additional hydraulic cylinder and a telescopic guide which is parallel thereto, the hydraulic cylinder and telescopic guide being fastened at one end to the pivot lever and engaged at the other end on a front articulation point on the rear roof part. The rear roof part is mounted movably in such a manner that it can be raised from the folding-top compartment flap and out of its closed position, by the lever and hydraulic cylinder devices being pivoted and actuated, and can be swung forwards over the front roof part. After the rear roof part has been locked to the front roof part and the roof link has been unlocked, actuation of the lever and hydraulic cylinder devices causes the front roof part to be swung as a unit to the rear together with the rear roof part into a stowage space and to be put away horizontally therein. The front roof part moves in accordance with the guidance provided by its pivot link and by the lever and hydraulic cylinder devices of the rear roof part. However, this horizontal storage of the front roof part and of the rear roof part requires a large stowage space which reaches right into the trunk and reduces the size of the latter.

SUMMARY OF THE INVENTION

According to a first aspect of the present invention, there is provided a vehicle roof for a convertible vehicle, the roof comprising at least one front roof part and at least one rear roof part, the front roof part being supported by means of a pivot-bearing device which is mounted displaceably on a guide device, the guide device, in use, being fixed on a vehicle such that, during the opening and putting away of the front roof part, the pivot-bearing device moves along the guide device, and in the process, lowers the front roof part into a roof storage space of the vehicle.

In the preferred embodiment, the front roof part is brought by a swinging movement into a position from which the front roof part is lowered and inserted into the roof storage space by a displacing movement. In comparison with a swinging movement, the displacement of the front roof part into a comparatively narrow roof storage space can be designed as a sequence of movements which can be executed in a simple manner. The front roof part may comprise two or more elements which, in turn, can be moved relative to one another.

In a particularly preferred arrangement, the front roof part, when being lowered into the roof storage space, is arranged in an obliquely set or substantially vertical position. In the preferred embodiment, in the storage position, the front edge of the front roof part points upwards and the rear edge is arranged above the roof storage space or is already pivoted into the latter. The front roof part is therefore set upright with respect to the direction of travel, with the inside of the front roof part pointing forwards.

According to a preferred arrangement, the roof storage space extends downwards behind the seats. In the case of a two-seater cabriolet, the space behind the driver's and front-passenger's seat is therefore used as the roof storage space, said space running downwards and obliquely forwards from the opening on the top side in accordance with the inclination of the rear seat backs. This arrangement of the put-away vehicle roof is particularly saving of space in the longitudinal direction of the vehicle and therefore the volume of the customary trunk is not restricted. Furthermore, the approximately vertical orientation of the put-away vehicle roof in the substantially vertical roof storage space means that a useful space which is optionally provided directly behind the seats remains accessible from above even when the vehicle roof has been put away. In the case of a vehicle having a second, rear seat row, the roof storage space can be arranged in a corresponding manner behind the rear seat row.

The pivot-bearing device supporting the front roof part may comprise a multibar mechanism, and in particular a four-bar mechanism, which is mounted displaceably on the guide device. A four-bar or other multi-bar mechanism enables a certain course of movement to be set for the swinging of the front roof part. Thus, for example, a rear edge of the front roof part can be lowered in a manner deviating from a circular path and, for example, can be moved in front of the roof rear part which has already been lowered into the roof storage space. A four-bar mechanism of this type is arranged on the right-hand side and on the left-hand side of the vehicle or vehicle roof. A seven-bar mechanism may be used.

In one preferred embodiment, the pivot-bearing device and the multi-bar mechanism is mounted on a slide which is mounted displaceably on the guide device. The slide forms a base which can be mounted in a play-free manner on the guide device and can be fixed on the guide device in any desired position in order to set intermediate positions of the front roof part during the opening or closing process.

The guide device may have a linear guide rail. On the other hand, a curved guide rail may be provided in which the slide can be moved and, by means of its change in inclination with regard to the longitudinal axis of the vehicle, also confers on the front roof part a corresponding pivoting movement to accompany the introducing movement into the roof storage space. In one arrangement, the guide rail is arranged substantially parallel to an oblique position of a seat back. This results in a particularly economical storage of the front roof part in terms of space.

The rear roof part may be mounted in a manner such that it can pivot about a transverse axis which is fixed on the vehicle and runs in particular in the region of an upper section of the guide device or guide rail. The exact position of the transverse pivot axis is determined in particular by the space required for putting the rear roof part away into the roof storage space and by the size of the rear roof part. Even if pivoting about a transverse axis fixed on the vehicle body is preferred, which transverse axis can be provided by a simply constructed pivot bearing, the rear roof part may also be lowered into the roof storage space by means of linear and/or curved displacing movements which can be combined with a pivoting movement.

The course of movement for opening and for closing the vehicle roof and for putting the roof parts away into the roof storage space and for removing them from the roof storage space can be resolved in different ways. For example, pivot-bearing devices for the front roof part and the rear roof part may be arranged in such a manner that, in order to completely open the vehicle roof, first of all, the rear roof part is swung at least partially into the roof storage space and subsequently, or partly at the same time, the front roof part is swung in front of the rear roof part and is retracted downwards into the roof storage space.

By way of another example, pivot-bearing devices for the front roof part and the rear roof part may be arranged in such a manner that, when the vehicle roof is opened, first of all the front roof part and the rear roof part are swung substantially together in the direction of the roof storage space until the rear roof part has reached its storage position, and subsequently the front roof part is swung in front of the rear roof part and retracted downwards into the roof storage space. The joint movement can be carried out by the two roof parts being coupled together or by means of two drives, and can be implemented by an electronic control, in particular, of two driving motors.

One control or movement variant makes provision for it to be possible, when the front roof part is closed, for the rear roof part to be put away into the roof storage space. This enables a relatively large opening to be set for ventilating or aerating the vehicle interior.

A further control or movement variant makes provision for it to be possible, when the front roof part is in the roof storage space, for the rear roof part to be in its closed position.

The rear roof part may usefully be formed as a roll-over protective structure and can be extended into a roll-over protective position. In this case, the rear roof part takes over the supporting of the roof in the event of an emergency, and so the front roof part can be constructed with less exacting strength requirements. For this purpose, the rear roof part may comprise reinforcements and can be driven by an emergency-pivoting device.

Furthermore, in a preferred arrangement, the front roof part, which is preferably arranged in an oblique or vertical position in front of the rear roof part, or an additional part mounted thereon, can be moved into a windbreak position and can be fixed therein. This means that a separate windbreak is not required. The front roof part may have a front, transparent roof section so that it does not obstruct the view to the rear when in the windbreak position.

The at least one front roof part and the at least one rear roof part are preferably rigid roof elements, but the vehicle roof may also be fitted with at least one flexible element.

If, when the vehicle roof is closed, a flexible roof covering spans the front roof part and the rear roof part, which parts are formed as rigid roof elements, and the roof covering is fastened to a front section of the front roof part and rests loosely on a rear section of the front roof part, then seals between the roof parts can be omitted.

The front roof part preferably contains a rear, preferably central, region which is left open in the storage position of the front roof part. This open region may be formed as a recess in the front roof part. A moveable or removable part, which may be a folding or sliding part, exposes the recess when moved or removed.

The front roof part and the rear roof part can each be swung by means of their own drive. Drives having an electric motor, for example, can be exactly controlled in the desired sequence of movement by means of an electronic control. Furthermore, the front roof part can be moved along the guide device by means of its own drive.

On the other hand, the opening and the closing of the vehicle roof may take place at least partially by manual movement of the front roof part and/or of the rear roof part.

According to a second aspect of the present invention, there is provided a convertible vehicle comprising a roof which has at least one front roof part and at least one rear roof part which are mounted movably on the body of the vehicle and which can be put away into a roof storage space of the vehicle, wherein the movable mounting of the front roof part and the roof storage space are arranged such that the front roof part lies in a substantially vertical orientation or at an oblique angle to the horizontal when put away in the roof storage space.

As discussed above, this arrangement saves space in the vehicle trunk which, in the prior art, was used to store one or both of the front and rear roof parts.

The movable mounting of the front roof part may be arranged such that the front roof part or an additional part mounted thereon can be extended into a windbreak position. In this embodiment, a separate windbreak, which would have to be carried, for example, as an additional part in the boot, is not required.

The front roof part is preferably supported by means of a pivot-bearing device which is mounted displaceably on a guide device fixed on the vehicle and which, during the opening and putting away of the front roof part, moves along the guide device. The front roof part can therefore be extended into the windbreak position and retracted again by means of a simple displacement.

According to a third aspect of the present invention, there is provided a convertible vehicle roof, the vehicle roof comprising at least one front roof part and at least one rear roof part each for movable mounting on the body of a vehicle between a closed position and a roof storage position, the front roof part having an open portion along a rear edge at least when in the roof storage position.

The open portion permits the front roof part to be lowered to a good depth in the vehicle body, even if a vehicle body part on the floor, such as a propeller-shaft tunnel, would otherwise obstruct this lowering.

In an embodiment, the front and rear roof parts are each rigid, there being a flexible roof covering which covers the front roof part and the rear roof part. The roof covering means that the recess cannot be seen when the vehicle roof is closed.

A movable or removable part may be provided for filling the open portion of the front roof part when in the closed position. The movable or removable part may be a folding or sliding part. In an embodiment, when the front roof part is lowered, the vehicle body part on the floor presses the folding or sliding part out of its position and occupies the space of the open portion.

According to a fourth aspect of the present invention, there is provided a convertible vehicle roof, the vehicle roof comprising at least one front roof part and at least one rear roof part each for movable mounting on the body of a vehicle between a closed position and a roof storage position, the front roof part and the rear roof part each being formed as rigid roof elements and form a hard top roof which is spanned by a flexible roof covering in the closed position.

By means of the roof covering, any gaps between the front and rear roof parts are covered in the closed position of the vehicle roof and are also sealed so that (further) seals are not required. Furthermore, a possible height offset is compensated for and wind noises reduced by virtue of the transitions between the individual roof parts being covered. The appearance of the rigid roof corresponds approximately to that of a folding roof having a flexible folding top.

According to a fifth aspect of the present invention, there is provided a convertible vehicle roof, the vehicle roof comprising at least one front roof part and at least one rear roof part each for movable mounting on the body of a vehicle between a closed position and a roof storage position, the rear roof part being formed as a roll-over protective structure and being extendable from its roof storage position into a protective position by an emergency-pivoting device.

The rear roof part of this aspect can replace a fixedly installed roll bar. On the basis of a triggering signal, for example, from an inclination sensor, the lowered rear roof part can be extended by means of the emergency-pivoting device into its protective position within a period of, for example, 300 ms. In the extended position, the rear roof part may be fixedly supported against folding inwards, for example, by means of a latching device.

An embodiment of the present invention will now be described by way of example with reference to the accompanying drawings.

DETAILED DESCRIPTION OF THE INVENTION

In the following, the description of the vehicle roof is given principally with reference to the bearing devices, etc. which face the reader and are on the left-hand side of the vehicle, in which case, of course, the opposite, right side of the vehicle also has the corresponding bearing devices, etc.

Figure 1:
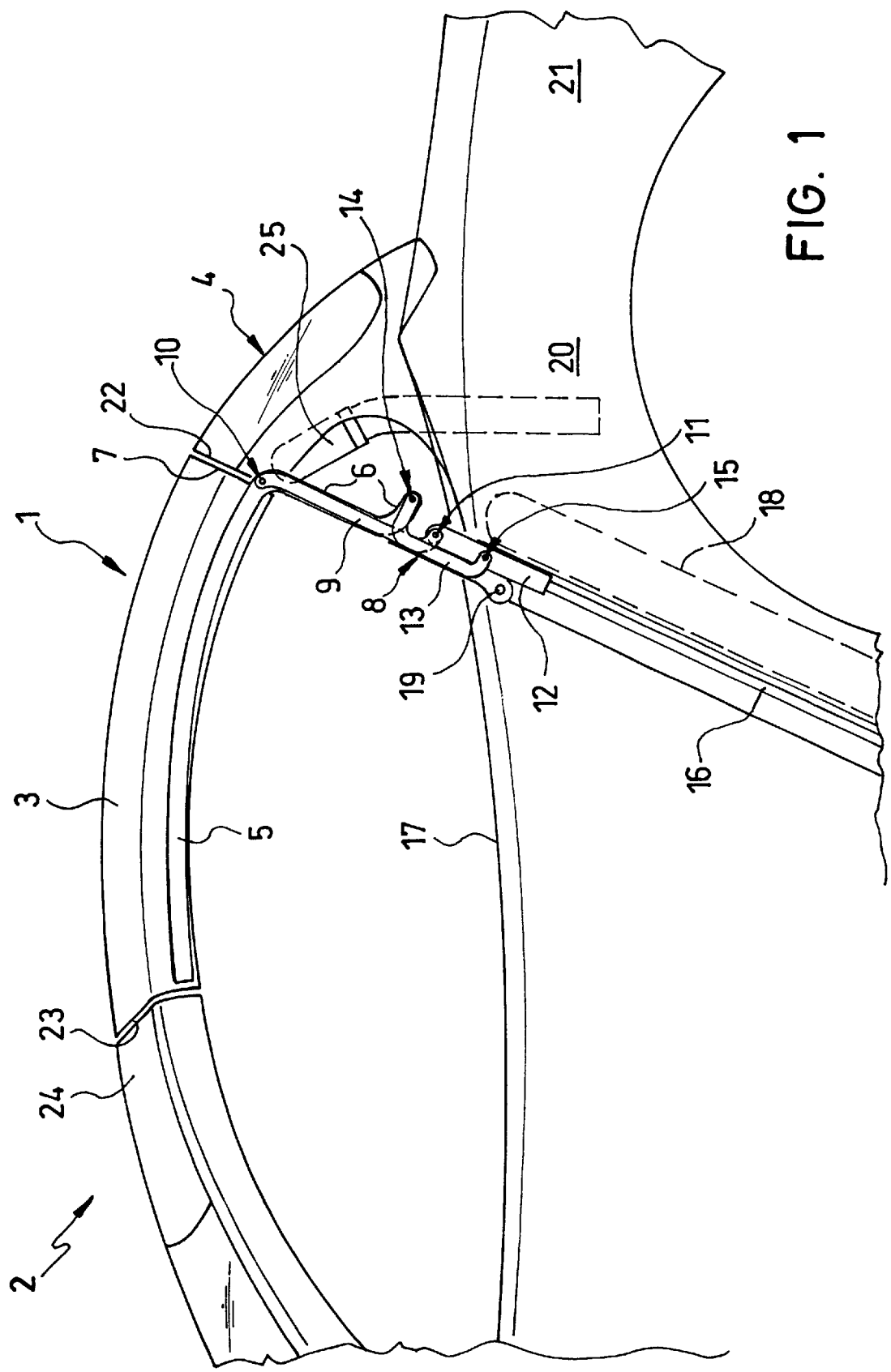
FIG. 1 is a side view of an example of a hard top vehicle roof of a cabriolet in the closed position in accordance with an embodiment of the present invention.

Referring to FIG. 1, a vehicle roof 1 of a cabriolet vehicle 2, which roof is designed as a convertible hard top, has a rigid front roof part 3 and a rigid rear roof part 4. The front roof part 3 has a roof frame 5 on each of the two roof longitudinal sides. Each roof frame 5 has a rear supporting section 6 which runs downwards at the rear edge 7 of the front roof part 3 and which, in the closed position of the vehicle roof 1 which is illustrated in FIG. 1, is orientated along a lateral front edge 8 of the rear roof part 4. Each supporting section 6 is arranged to lie on the inside of the rear roof part 4 when the vehicle roof 1 is in the closed position, for example, behind a respective door seal for a door side window which is fixed on the lateral front edge 8 of the rear roof part 4.

A pivot-bearing device of the front roof part 3 is formed as a four-bar mechanism having a first lever 9 and a second lever 13. The first lever 9 is mounted such that it can pivot by means of two joints 10, 11 on the roof frame 5 in the region of its rear edge 7 and on a displaceable slide 12 respectively. The second lever 13 is mounted such that it can pivot by means of two joints 14, 15 on the supporting section 6 and on the slide 12 respectively. The relative position of the four joints 10, 11, 14, 15 is defined in accordance with the course of movement of the four-bar mechanism, which course of movement is required for the pivoting movement of the front roof part 3.

The slide 12 is mounted displaceably on a guide device, such as, for example, a guide rail 16. In the exemplary embodiment, the guide rail 16 is formed linearly and runs downwards and forwards of the vehicle 2 at an oblique angle relative to the lateral upper edge 17 of the vehicle body. In the example shown, the guide rail 16 is arranged on the vehicle body at a position approximately adjacent a vehicle seat 18 and its oblique orientation is matched to the average inclination of the backrest of the seat 18 (indicated schematically in FIG. 1 by dashed lines). The guide rail 16 may alternatively have or include a curved profile.

The rear roof part 4 surrounds the vehicle interior at the rear and on both sides. The rear roof part 4 is pivotally mounted on both sides by respective joints 19 arranged on the vehicle body slightly below the lateral upper edge 17 of the vehicle body such that the rear roof part 4 can be swung about a transverse axis and can be lowered downwards into a roof storage space 20. The roof storage space 20 extends behind the seat 18 and downwards from the lateral upper edge 17 of the vehicle body. A customary trunk 21 adjoins the roof storage space 20 in the rear end of the vehicle 2.

In the closed position of the vehicle roof 1 shown in FIG. 1, a seal (not illustrated) which is arranged on the front roof part 3 or the rear roof part 4 seals a separating gap between a central front edge 22 of the rear roof part 4 and the rear edge 7 of the front roof part 3.

Figure 2:
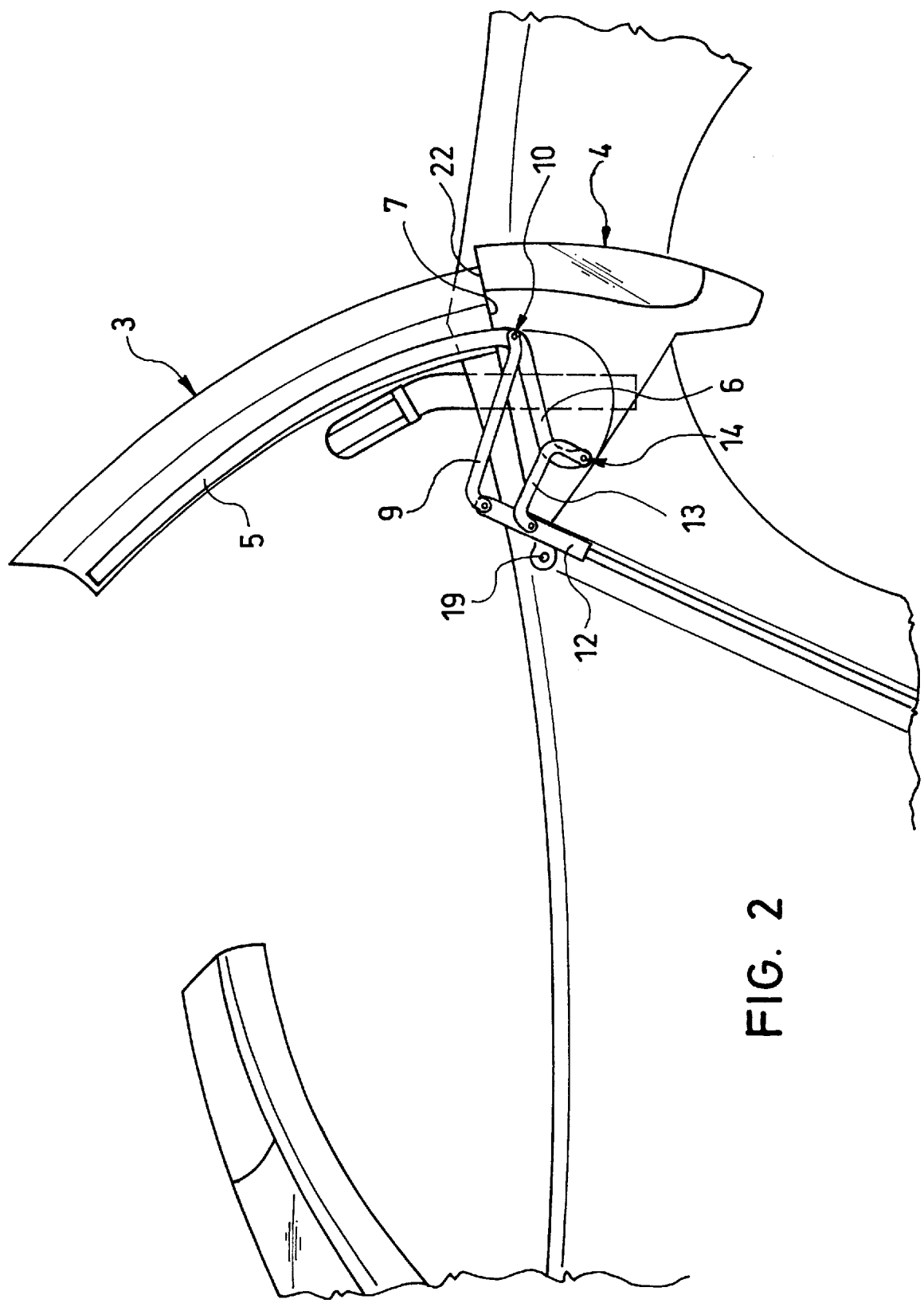
FIG. 2 is a side view of the vehicle roof of FIG. 1 during the opening process with the front roof part and rear roof part swung rearward.

In order to open the closed vehicle roof 1 from the closed state shown in FIG. 1, first of all, the front roof part 3, which in the closed position, bears with its front edge 23 against a windshield cowl 24, and the rear roof part 4 are swung together towards the rear of the vehicle 2. In the process, the rear roof part 4 is swung downwards about the joint 19 until it has taken up its storage position in the roof storage space 20 as shown in FIG. 2. The four-bar mechanism moves the pivoting front roof part 3 in such a manner that the rear edge 7 of the front roof part 3 is offset forwards with respect to the longitudinal axis of the vehicle relative to the front edge 22 of the lowered rear roof part 4.

Figure 3:
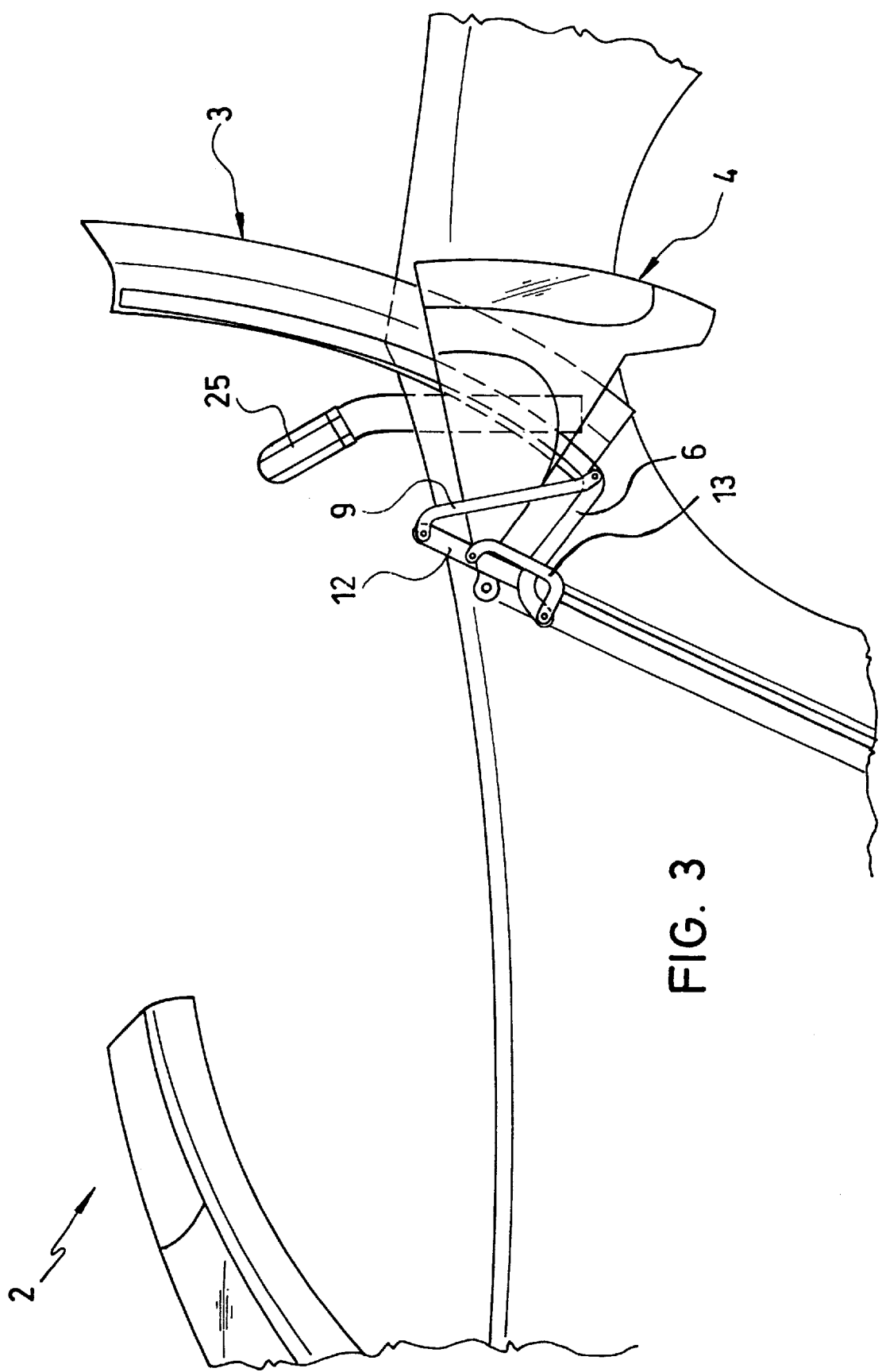
FIG. 3 is a side view of the vehicle roof of FIG. 1 in an intermediate opening position.

Then, the front roof part 3, which continues to be moved, is swung downwards in front of the rear roof part 4 until it has taken up a slightly inclined orientation with respect to the vertical as shown in FIG. 3. In the process, the front roof part 3 grips behind a roll bar 25 which is arranged directly behind the seat 18. In this final swung position taken up by the front roof part 3, the four-bar mechanism bears, for example, against a stop and is blocked against further pivoting movement.

Figure 4:
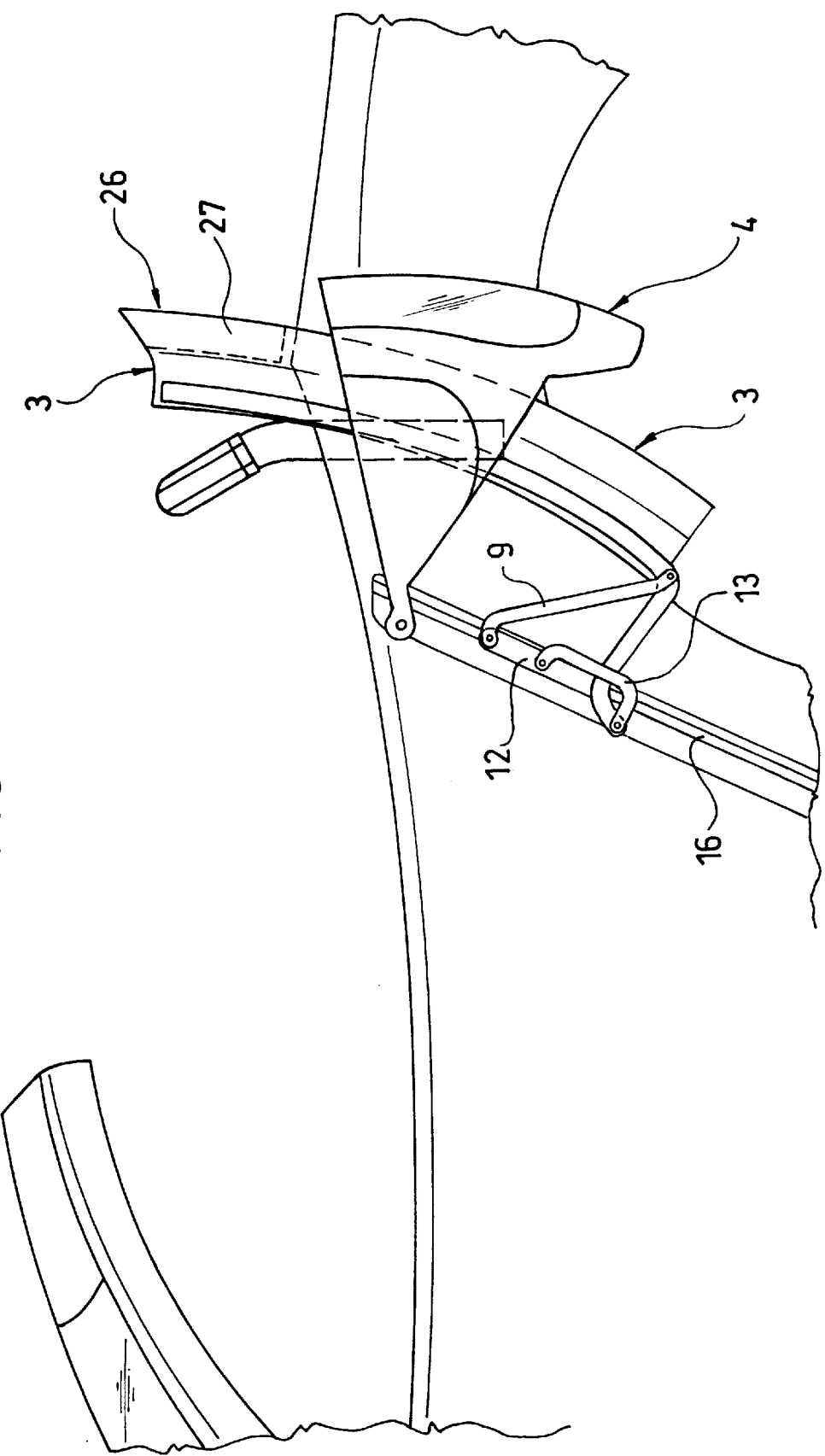
FIG. 4 is a side view of the vehicle roof of FIG. 1 in an intermediate opening position during lowering of the front roof part.

The front roof part 3 is then moved further downwards from the intermediate position shown in FIG. 3 by the slide 12 being moved downwards along the guide rail 16. FIG. 4 shows a further intermediate position during the displacement of the front roof part 3, while the lower storage position of the front roof part 3 in the roof storage space 20 is shown in FIG. 5.

The rear roof part 4 is preferably swung downwards by means of a drive having an electric motor (not shown). As an alternative, the rear roof part 4 can be lowered by manual pivoting after a locking arrangement has been released. The pivoting movement of the front roof part 3 and the displacing movement of the slide 12 likewise preferably take place by means of a respective drive or drives (not shown), for example, via electric motor drives having driving cable connections. As an alternative, a manual actuation may also be provided for movement of the front roof part 3 and the slide 12.

Figure 5:
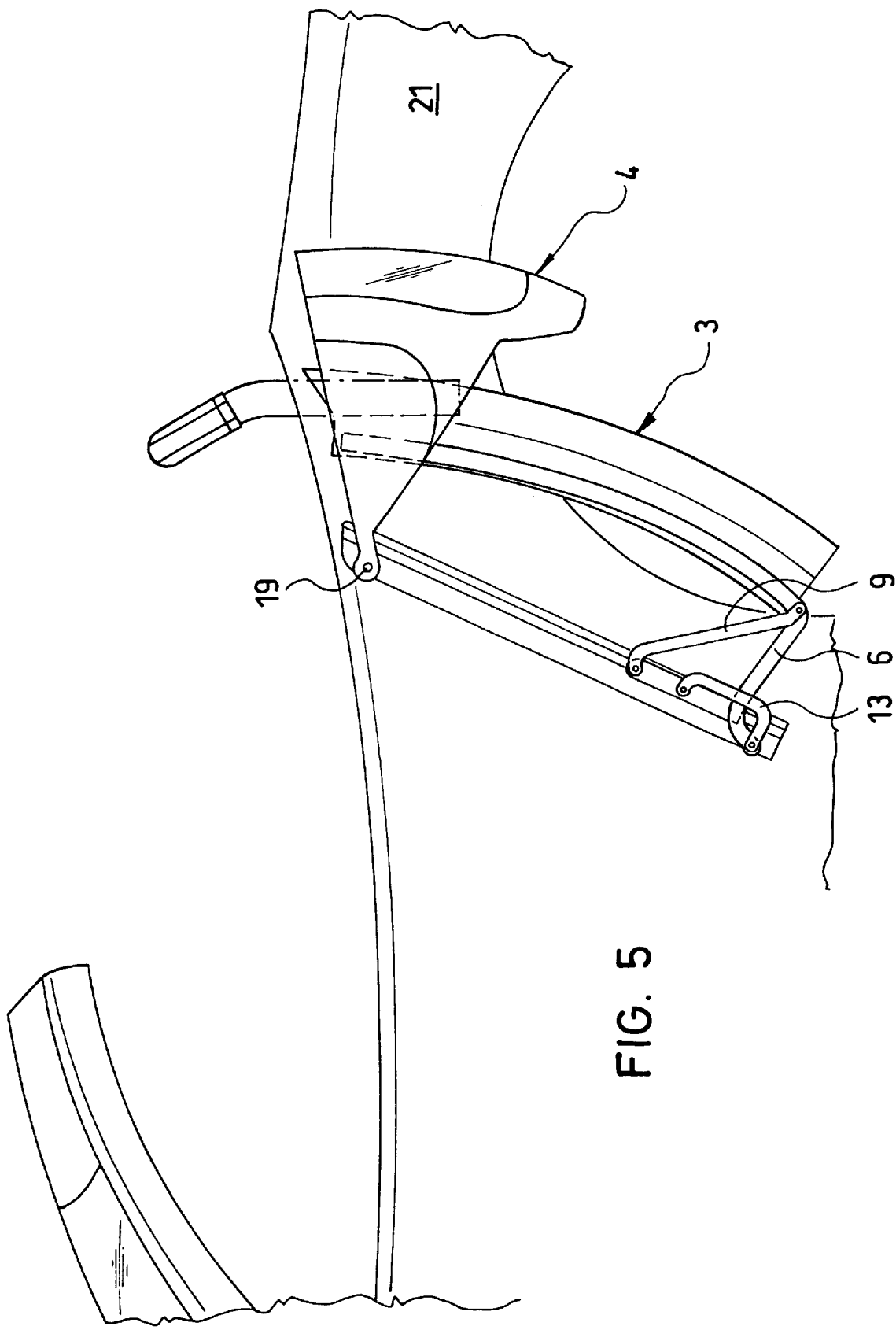
FIG. 5 is a side view of the opened vehicle roof of FIG. 1 with roof parts put away in a roof storage space.
Figure 6:
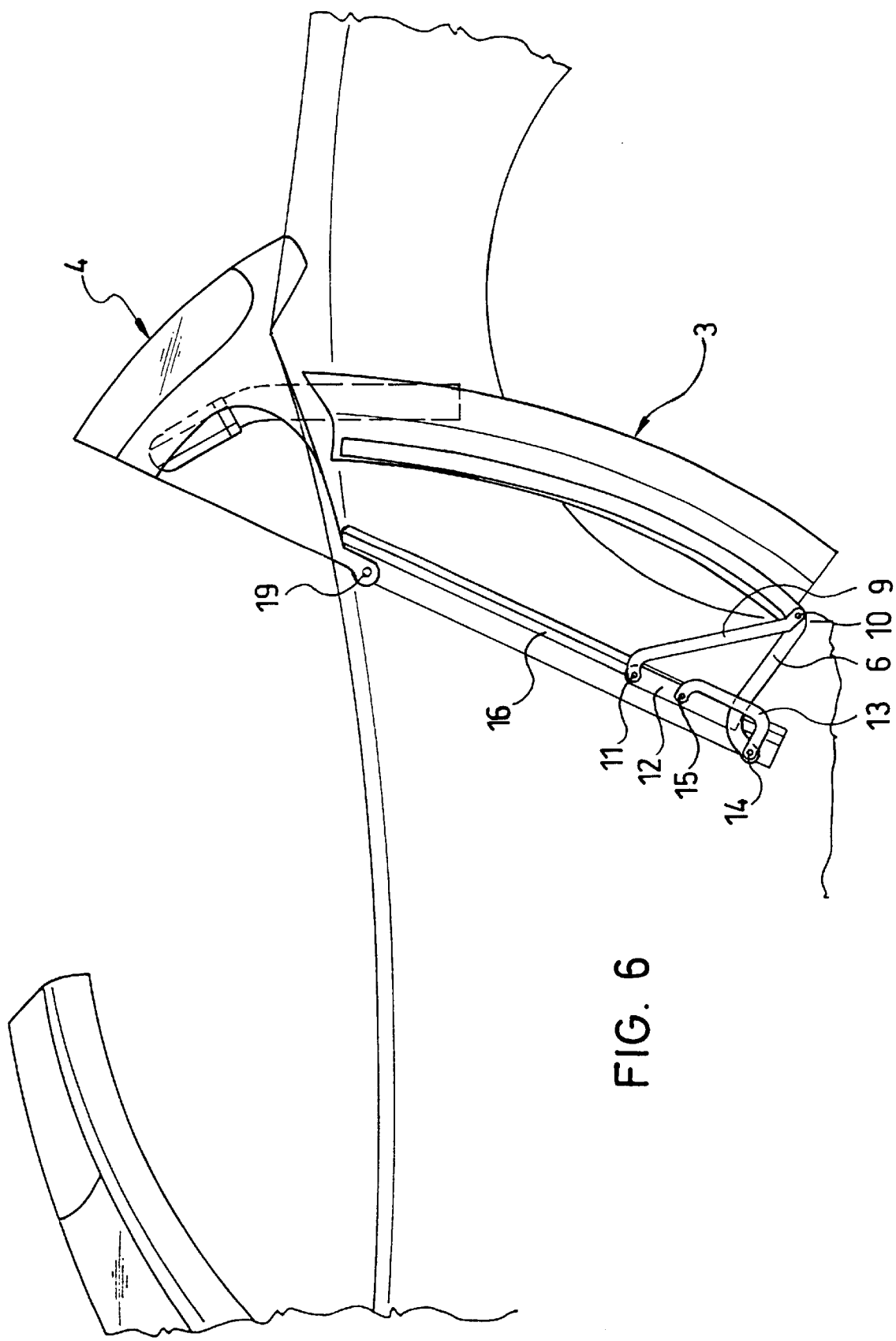
FIG. 6 is a side view of the opened vehicle roof of FIG. 1 with extended rear roof part.

The rear roof part 4 can optionally be swung upwards again out of the complete storage position of the vehicle roof 1 shown in FIG. 5 into its original closed position and can be fixed in this position, without a corresponding closed position of the front roof part 3, as shown in FIG. 6. This setting of the vehicle roof 1 corresponds to a vehicle referred to as a targa and provides improved protection against draughts when driving with an opened roof.

Figure 7:
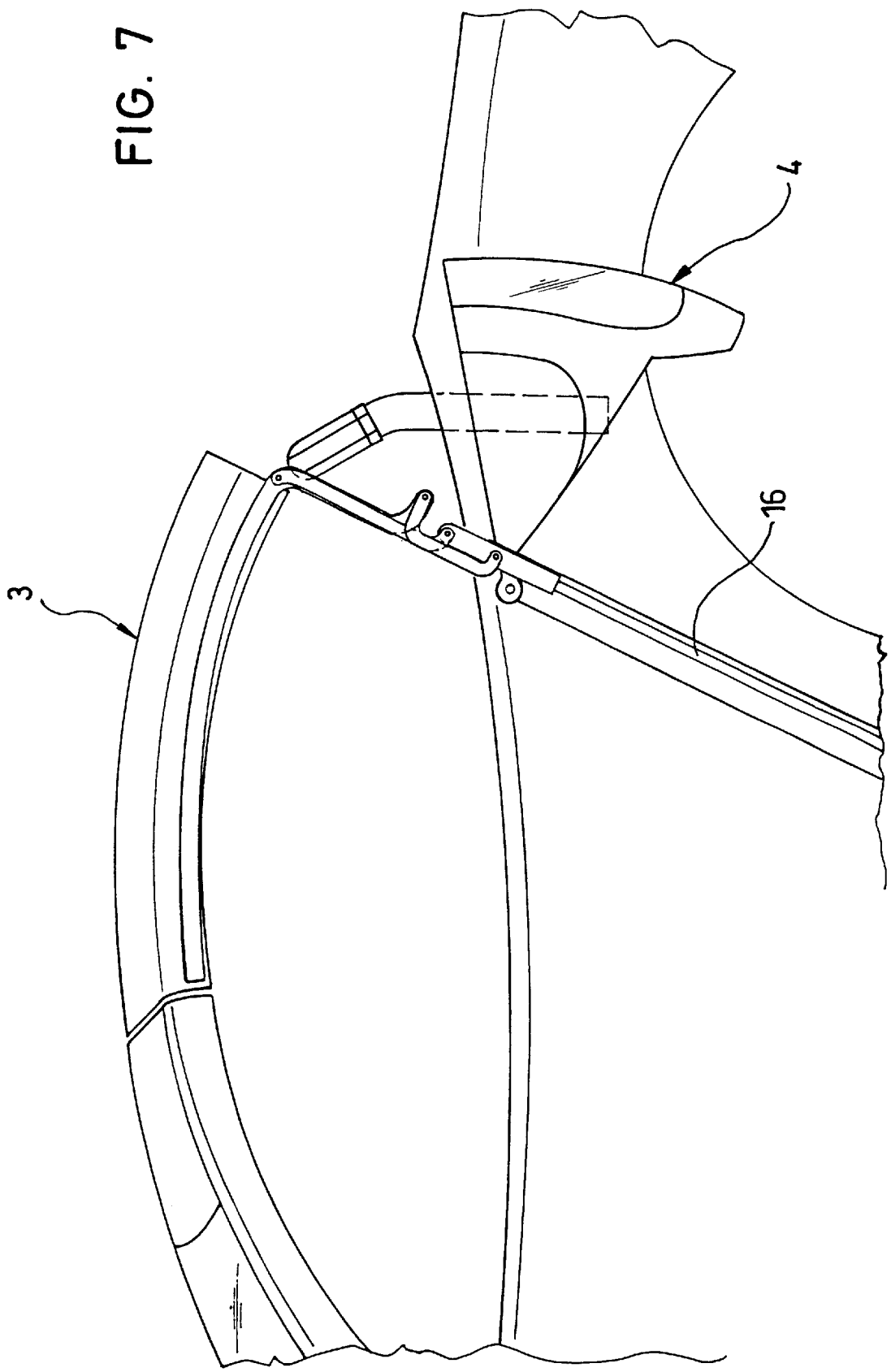
FIG. 7 is a side view of the partially opened vehicle roof of FIG. 1 with lowered rear roof part.

The intermediate position of the vehicle roof shown in FIG. 7 may also be set as a driving position in which movement of the rear roof part 4, which has been swung downwards, releases a large roof opening for ventilating the vehicle interior. This intermediate position can be set from the closed position of the vehicle roof 1 shown in FIG. 1 by the rear roof part 4 being swung downwards, or from the open position shown in FIG. 5 by the front roof part 3 being raised and swung back, or from any desired intermediate position.

As an alternative, the front roof part 3 can be brought, by moving the slide 12 along the guide rail 16, out of the complete storage position of the vehicle roof 1 shown in FIG. 5, into a raised position which corresponds, for example, to the position shown in FIG. 4. In this position, the front section 26 of the front roof part 3, which front section 26 protrudes approximately vertically upwards behind the roll bar 25, takes on the function of a windbreak. This windbreak position may also be set even as the front roof part 3 is being lowered during the opening of the vehicle roof 1. At least a central part 27 of the front section 26 of the front roof part 3 (illustrated schematically in FIG. 4 by dashed lines) may be formed from transparent material if necessary so that the front roof part 3 when used as a windbreak does not obstruct the view to the rear of the vehicle 2.

The setting of the closed position of the vehicle roof shown in FIG. 1 takes place from a position shown in FIG. 5 in a sequence of movements opposite to that described above.

Figure 8:
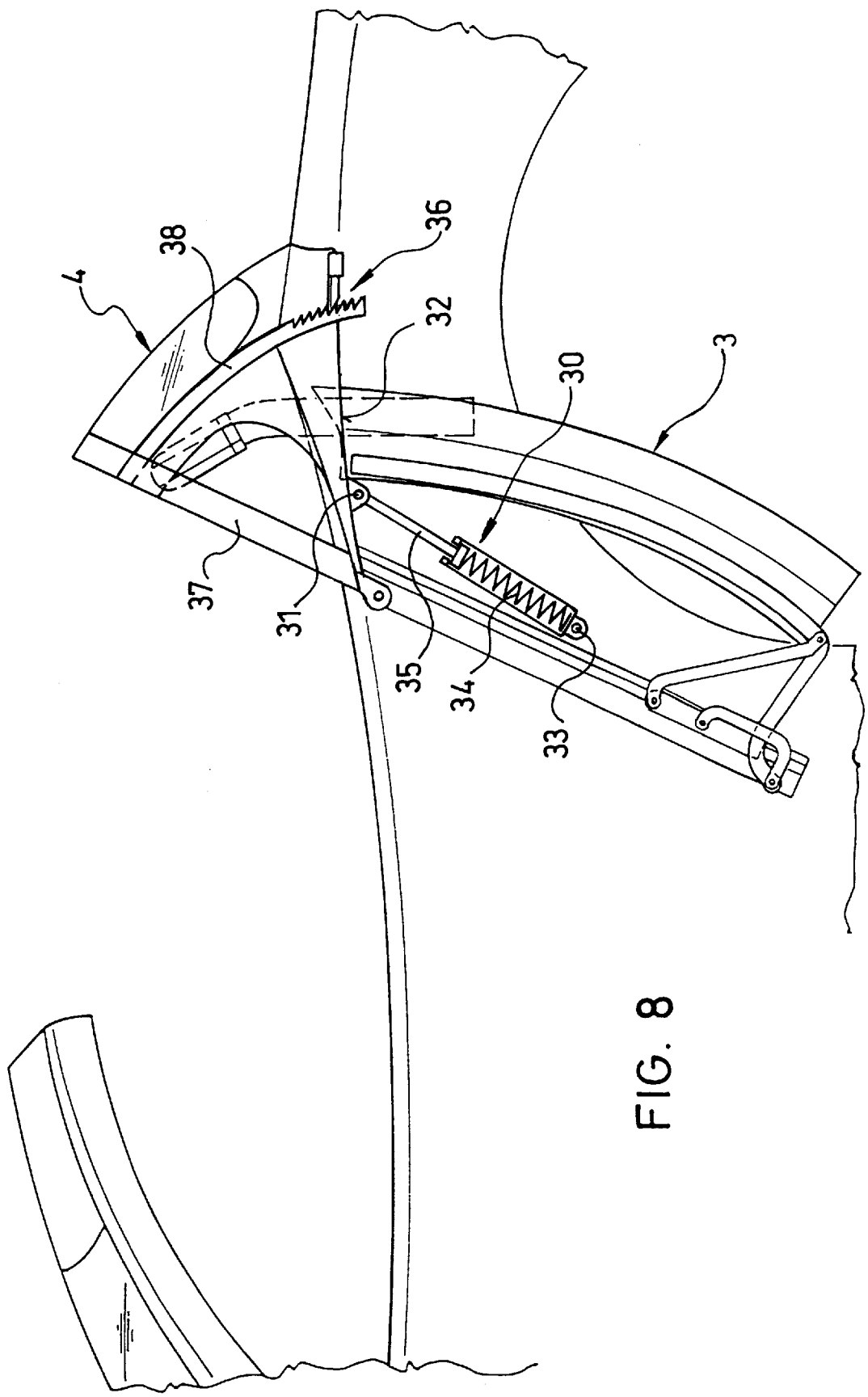
FIG. 8 is a side view of a further example of a rear roof part formed as an extendable roll-over protective structure in accordance with an embodiment of the present invention.

In a preferred arrangement of the vehicle roof 1, the rear roof part 4 serves as a roll-over protective structure or roll bar which can be extended in the event of an emergency as shown in FIG. 8. An emergency-pivoting device, for example, a spring cylinder 30, engages at one end with an articulation point 31 on a lateral lower edge 32 of the rear roof part 4 and is supported at the other end on the vehicle body at a supporting point 33. In a lowered position of the rear roof part 4, for example, the position shown in FIG. 4, a spring 34 of the spring cylinder 30 (FIG. 8) is pre-stressed and held in a blocked manner by means of a catch which can be actuated by a lifting magnet. In the event of an emergency, the lifting magnet is actuated by means of a signal from an inclination sensor and the catch is unlocked, so that the spring 34 extends a piston 35 of the spring cylinder 30. The piston 35 in turn extends the rear roof part 4 into the protective position shown in FIG. 8. A latching device 36, which is arranged between the vehicle body and the rear roof part 4 and is intended for setting a plurality of latching positions, holds the swung-out rear roof part 4 in the roll-over protective position. In order to lower the swung-out rear roof part 4, the latching device 36 is unlocked, for example by the pivoting drive for putting away the rear roof part 4. The rear roof part 4 has appropriate reinforcements, for example, in the form of an incorporated or integrally formed front bracket 37 and longitudinal struts 38.

As an alternative, the spring cylinder 30 can be held continuously under pre-stress and can be moved together with the usual pivoting of the rear roof part 4. In the lowered open position of the rear roof part 4 shown, for example, in FIG. 5, that supporting end of the spring cylinder 30 which is on the vehicle-body side is fixed to a bearing part which is fixed on the vehicle body, so that the reaction force during the triggering of the emergency-pivoting device can be supported by the vehicle body.

The emergency-pivoting device may, for example, also or alternatively, have a pyrotechnic or explosive device for rapid pivoting out of the rear roof part 4.

The example shown in FIGS. 9 to 12 is a modification of the above-described, embodiment of the vehicle roof 1 and includes, in contrast, a flexible roof covering 40 (illustrated in a shaded manner in FIG. 9), for example, a folding-top material or the like. The flexible roof covering 40 completely covers the vehicle roof 1 with the exception of a rear window 44. The flexible roof covering 40 is fastened on a front section 41 of the front roof part 3, for example, by bonding as far as the illustrated dashed line of separation 45, rests in a tensioned manner on a rear section 42 of the front roof part 3 in the closed position of the vehicle roof 1 shown in FIG. 9, and is fastened to the rear roof part 4, for example, by sheet-like bonding.

Figure 9:
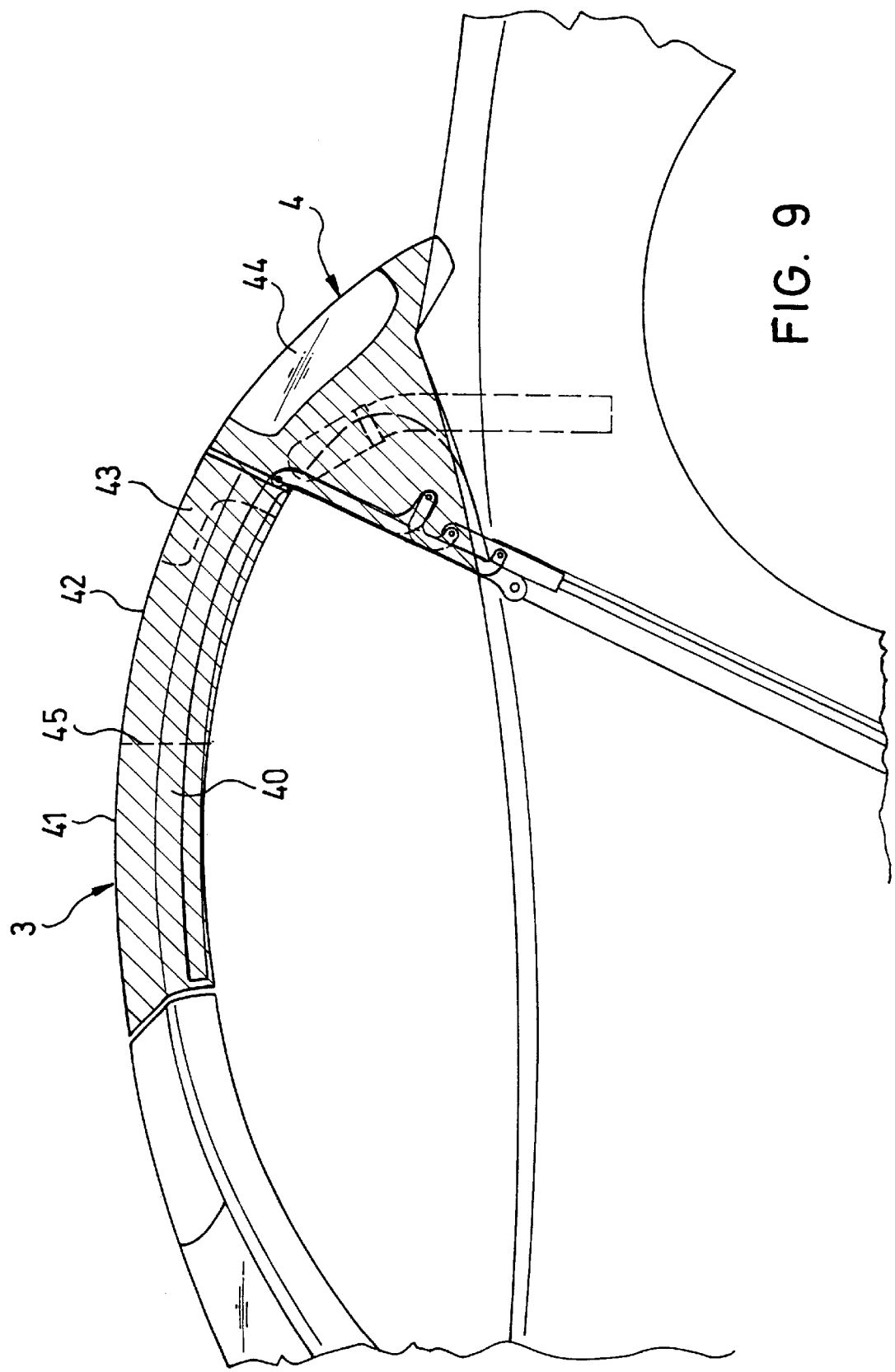
FIG. 9 is a side view of a further example of a vehicle roof according to an embodiment of the present invention with a roof covering.
Figure 10:
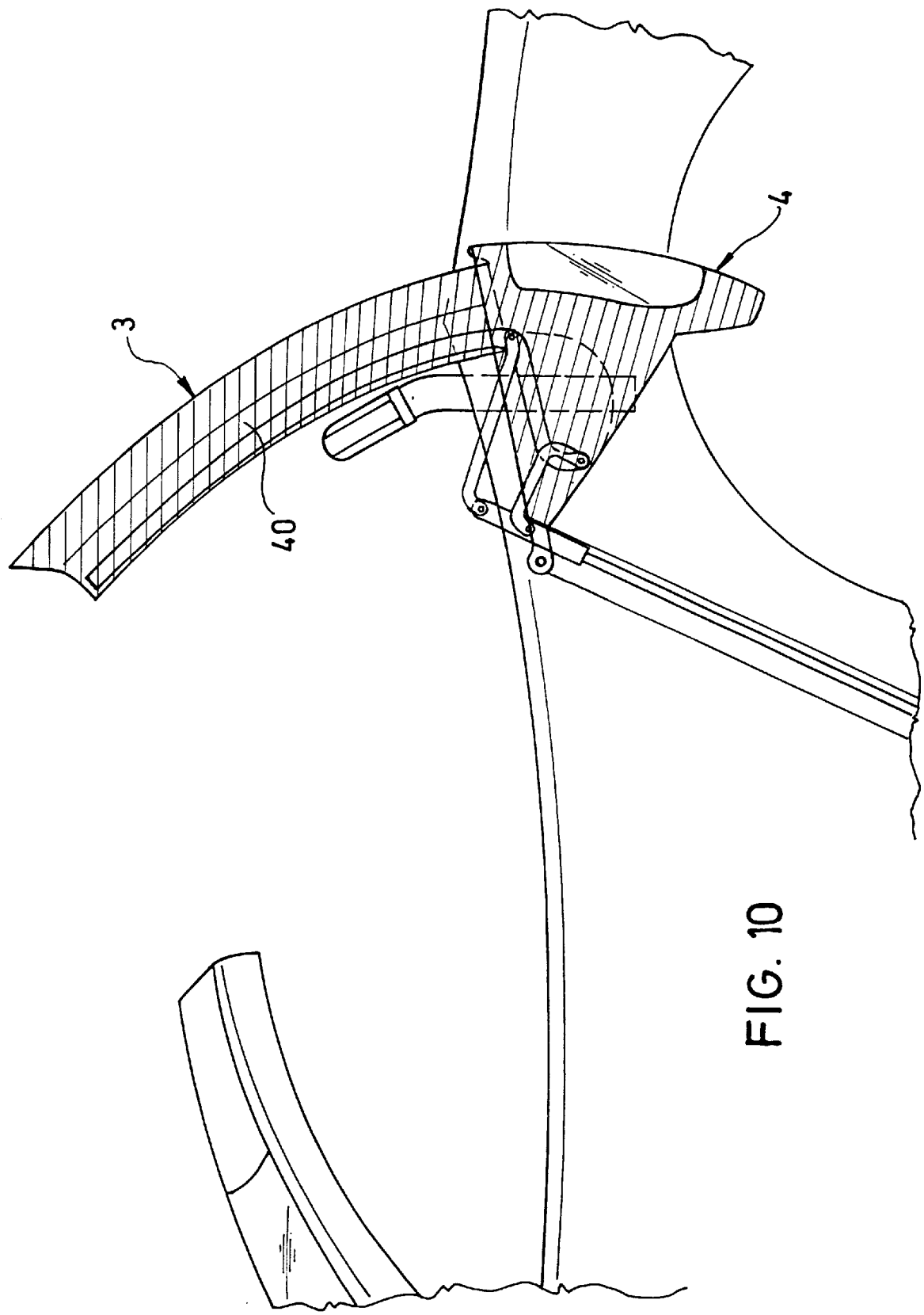
FIG. 10 is a side view of the vehicle roof of FIG. 9 during the opening movement.

During the initial opening of the vehicle roof 1 from the closed position shown in FIG. 9 to an intermediate position shown in FIG. 10, the front roof part 3 and the rear roof part 4 are simultaneously swung rearwards, in which case the rear edge 7 of the front roof part 3 is moved forwards relative to the front edge 22 of the rear roof part 4, which front edge 22 is swung over an arc of a circle, in a manner similar to that described above for the first example. The middle portion of the roof covering 40, which merely rests on the rear section 42 of the front roof part 3, can be raised to permit this offset.

Figure 11:
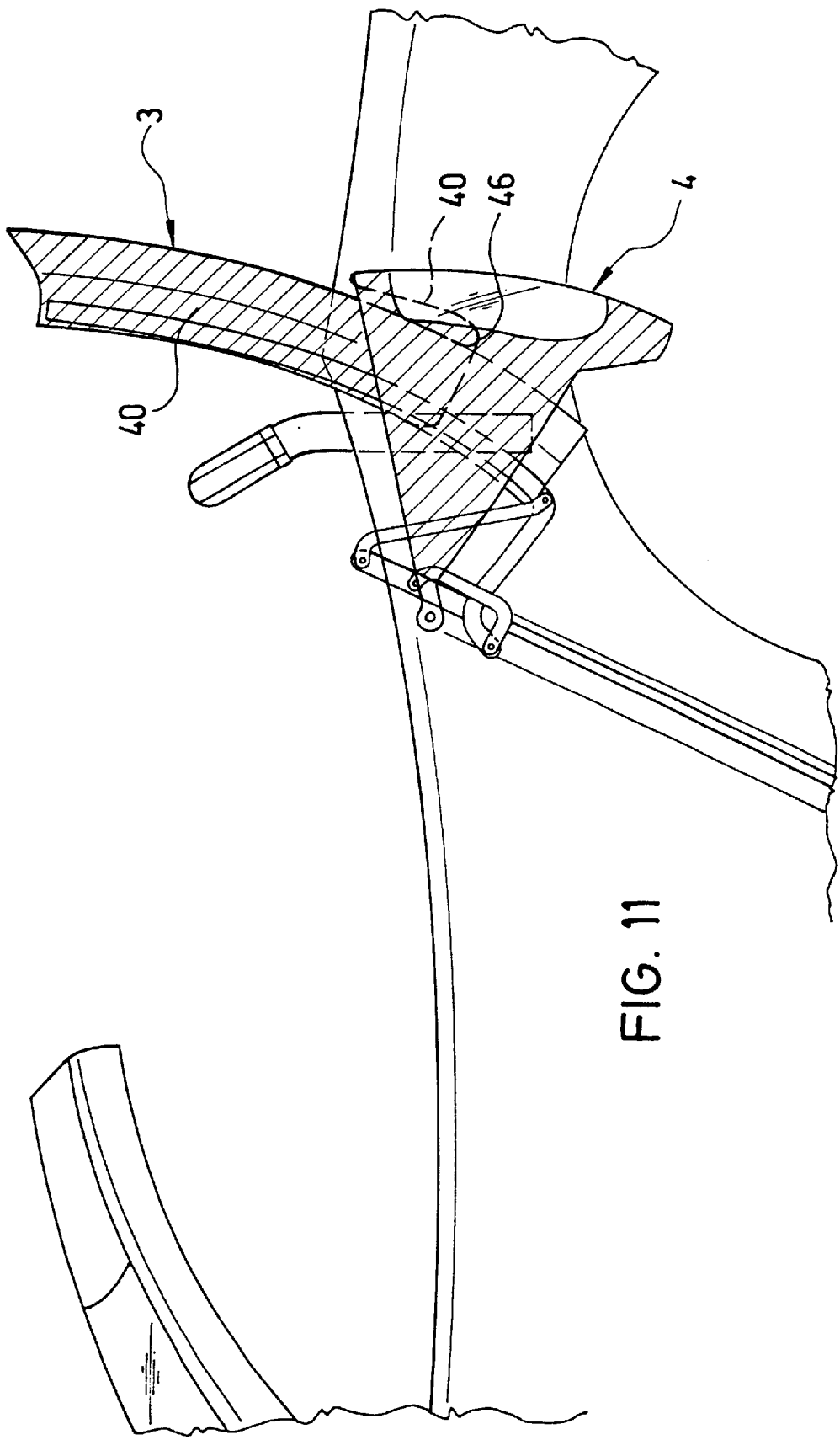
FIG. 11 is a side view of the vehicle roof of FIG. 9 in a further position during the opening movement.

During the further opening movement of the vehicle roof 1, the front roof part 3 is swung past the rear roof part 4 on the inside in a manner similar to that described above for the first example, in which case the middle portion of the roof covering 40 is raised from the front roof part 3 as a fold 46 as shown in FIG. 11.

Figure 12:
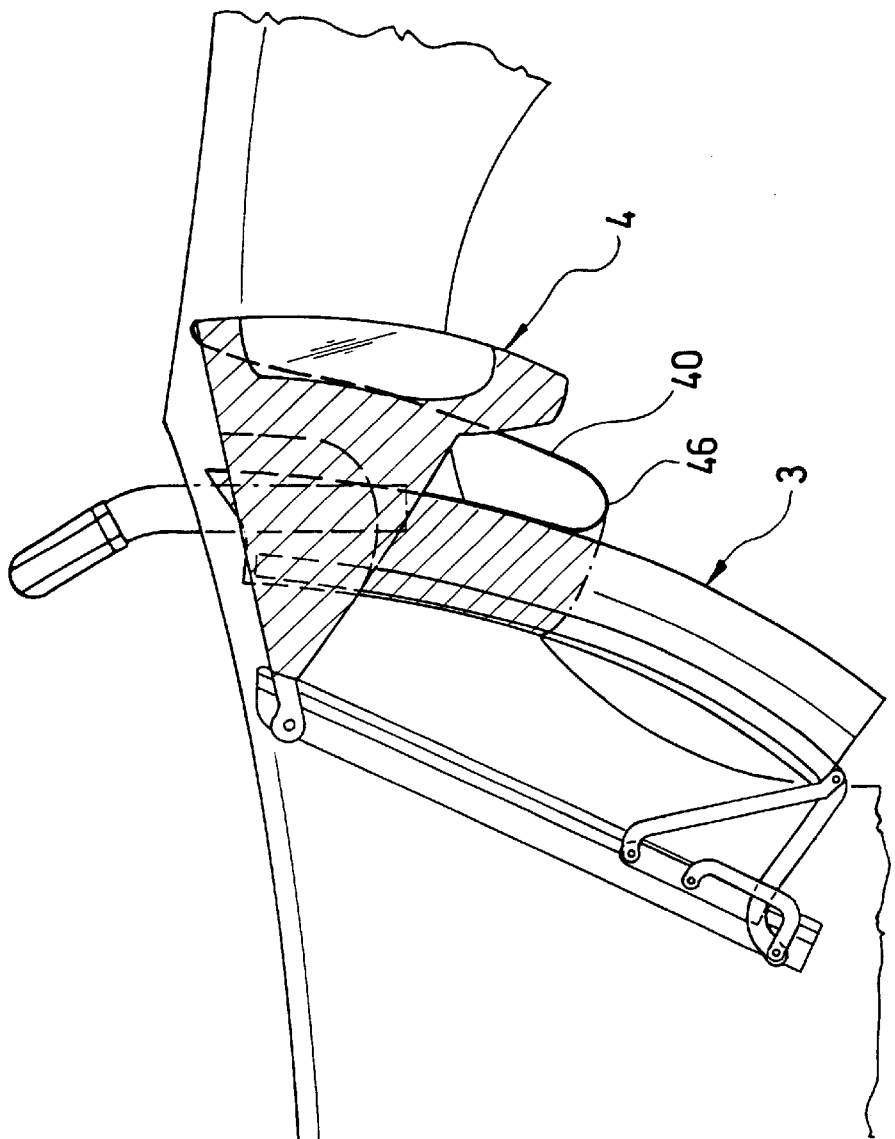
FIG. 12 is a side view of the opened vehicle roof of FIG. 9 in its storage position in the roof storage space.

During the subsequent, downwardly directed displacing movement of the front roof part 3 into the storage position, the middle portion of roof covering 40 is further raised from the front roof part 3 as shown in FIG. 12.

It will be appreciated that a seal between the front roof part 3 and the rear roof part 4 is not required in this example since the separating gap is tightly covered by the roof covering 40.

In any embodiment, as shown by way of example in FIG. 9, the front roof part 3 optionally contains, on its rear edge, a recess 43 which is, for example, arranged centrally and is shaped, for example, in such a manner that it is able, when the front roof part 3 is completely swung down, to accommodate a vehicle body component which is on the floor and protrudes upwards, such as, for example, a drive-shaft tunnel. In this manner, even a front roof part 3 which has a relatively great length can nevertheless take up a deep storage position in the vehicle body, even if a vehicle body component which is arranged, in particular, on the floor and protrudes upwards would otherwise not permit this. In the closed position of the vehicle roof 1, this recess 43 is spanned and covered by the flexible roof covering 40. A displaceable interior lining part or roof lining part (not shown) can cover the recess 43 on the vehicle interior.

A recess 43 of this type may also be coverable or fillable by at least one movable element (not shown). If required, the movable element is moved or removed to expose the recess 43 as the front roof part 3 is being put away and is moved back to close the recess 43 in the closed position of the vehicle roof. This variant is also suitable for a vehicle roof of this type which does not have a covering roof covering.

Embodiments of the present invention have been described with particular reference to the examples illustrated. However, it will be appreciated that variations and modifications may be made to the examples described within the scope of the present invention.

What is claimed is:

1. A convertible vehicle having a vehicle roof comprising:
   a vehicle body with a roof storage space,
   at least one front roof part, and
   at least one rear roof part,
   a guide device fixed on said vehicle body,
   a pivot-bearing device displaceably mounted on the guide device,
   wherein the front roof part is supported by the pivot-bearing device in a manner causing the front roof part to be moved into the roof storage space of said vehicle body by displacement of the pivot-bearing device along the guide device.

2. A convertible vehicle according to claim 1, further comprising a seat, and wherein the roof storage space extends downwards behind the seat.

3. A convertible vehicle according to claim 1, further comprising a pivot-bearing supporting the rear roof part, the pivot-bearing device for the front roof part and pivot-bearing for the rear roof part being arranged such that the rear roof part is swingable at least partially into the roof storage space, and subsequently or substantially simultaneously, the front roof part swingable in front of the rear roof part and lowerable into the roof storage space to completely open the vehicle roof.

4. A convertible vehicle according to claim 1, further comprising a pivot-bearing supporting the rear roof part, the pivot-bearing device for the front roof part and pivot-bearing for the rear roof part being arranged such that, first the front roof part and the rear roofpart are swingable substantially together toward the roof storage space until the rear roof part has reached a storage position, and subsequently, the front roof part is swingable in front of the rear roof part and lowerable into the roof storage space for opening the vehicle roof.

5. A convertible vehicle according to claim 1, wherein the roof parts are arranged in manner enabling the rear roof part to be moved into an open position in the roof storage space while the front roof part remains in a closed position.

6. A convertible vehicle according to claim 1, wherein the roof parts are arranged in: manner enabling the front roof part to be in an open position in the roof storage space while the rear roof part is in a closed position.

7. A convertible vehicle according to claim 1, wherein the front roof part and the roof storage space are arranged such that the front roof part lies in a substantially vertical orientation or at an oblique angle to horizontal when in the roof storage space.

8. A convertible vehicle according to claim 7, wherein the movable mounting of the front roof part is arranged such that a front portion of the front roof part is extendable into a windbreak position with the front roof part partially stowed in the roof storage space.

9. A convertible vehicle according to claim 7, wherein the pivot-bearing device movable-along the guide device guide device for opening the front roof part and placing the front roof part in the roof storage space.

10. A convertible vehicle according to claim 1, wherein the pivot-bearing device comprises a multi-bar mechanism which is displaceably mounted on the guide device.

11. A convertible vehicle according to claim 1, wherein the pivot-bearing device is mounted on a slide which is mounted displaceably on the guide device.

12. A convertible vehicle according to claim 11, wherein the guide device comprises a guide rail.

13. A convertible vehicle according claim 12, wherein the guide rail is arranged at an oblique angle relative to horizontal.

14. A convertible vehicle according to claim 1, wherein the rear roof part is mounted in a manner enabling the rear roof part to pivot about a transverse axis located in a region of an upper section of the guide device.

15. A convertible vehicle according to claim 1, wherein the rear roof part is formed as a roll-over protective structure and is extendable into a roll-over protective position.

16. A convertible vehicle according to claim 15, comprising an emergency-pivoting device for driving the rear roof part into the roll-over protective position.

17. A convertible vehicle according to claim 1, wherein the front roof part is movable into and fixable in a windbreak position intermediate fully open and fully closed positions thereof.

18. A convertible vehicle according to claim 1, wherein the front roof part and the rear roof part are each rigid roof elements.

19. A convertible vehicle according to claim 17, wherein the front roof part has a transparent roof section at or towards its front edge, said transparent roof section being position to provide rearward vision therethrough when the front roof part is in said windbreak position.

20. A convertible vehicle according to claim 1, wherein the rear roof part has a rear window.

21. A convertible vehicle according to claim 1, comprising a respective drive for pivoting each of the front roof part and the rear roof part.

22. A convertible vehicle according to claim 1, comprising a drive for moving the front roof part along the guide device.

23. A convertible vehicle according to claim 1, wherein at least one of the front roof part and the rear roof part is at least partially manually movable for opening and closing of the vehicle roof.

24. A convertible vehicle according to claim 1, wherein the front roof part has a roof frame which extends downwards in a region of a rear edge of the front roof part and which bears at least part of the pivot-bearing device.

25. A vehicle roof for a convertible vehicle, the roof comprising:
   at least one front roof part,
   at least one rear roof part, and
   a guide device adapted to be fixed on said vehicle in use,
   a-pivot-bearing device displaceably mounted on the guide device,
   wherein the front roof part is supported by the pivot-bearing device in a manner causing the front roof part to be moved into a roof storage space of said vehicle by displacement of the pivot-bearing device along the guide device.

26. A vehicle roof according to claim 1, wherein the pivot-bearing device and the guide device are arranged such that, in use, the front roof part is arranged in an obliquely or substantially vertical swung-back position when being lowered into the roof storage space.

27. A vehicle roof according to claim 25, comprising a flexible roof covering which spans the front roof part and the rear roof part when the vehicle roof is closed, the roof covering being fastened to a front section of the front roof part and resting loosely on a rear section of the front roof part.

28. A vehicle roof according to claim 25, wherein the front roof part has a rear region which is open when the front roof part is in its storage position.

29. A vehicle roof according to claim 28, wherein said rear region is a recess in the front roof part.

30. A vehicle roof according to claim 29, comprising a movable or removable part for closing the recess when the front roof part is in a closed position.

* * * * *